United States Patent
Meier

Patent Number: 5,908,225
Date of Patent: Jun. 1, 1999

[54] PROCESS FOR ENSURING A NEUTRAL VEHICLE HANDLING DURING CORNERING AND A SIMULTANEOUS LOAD CHANGE

[75] Inventor: Kurt Meier, Unterschleissheim, Germany

[73] Assignee: Bayerische Motoren Werke Aktiengesellschaft, Munich, Germany

[21] Appl. No.: 08/807,747

[22] Filed: Feb. 27, 1997

[30] Foreign Application Priority Data

Feb. 27, 1996 [DE] Germany .................. 196 07 185

[51] Int. Cl.$^6$ ...................................... B60T 8/32
[52] U.S. Cl. .................. 303/146; 303/140; 303/DIG. 6; 180/197
[58] Field of Search ................ 303/DIG. 6, 146, 303/141, 147, 148, 140, 198, 190; 180/197, 245, 249, 250, 233, 247, 248; 701/70, 71, 72, 88, 82, 83, 78; 188/181 C, 181 A

[56] References Cited

U.S. PATENT DOCUMENTS

| | | |
|---|---|---|
| 4,809,181 | 2/1989 | Ito et al. . |
| 4,898,431 | 2/1990 | Karnopp et al. . |
| 5,124,921 | 6/1992 | Jonner et al. ............. 303/146 |
| 5,328,255 | 7/1994 | Isella ..................... 303/140 |
| 5,341,297 | 8/1994 | Zomotor et al. ........... 303/146 |
| 5,397,174 | 3/1995 | Willmann . |

FOREIGN PATENT DOCUMENTS

| | | |
|---|---|---|
| 0 621 162 | 10/1994 | European Pat. Off. . |
| 0 631 897 | 1/1995 | European Pat. Off. . |
| 33 30 236 | 3/1985 | Germany . |
| 35 18 221 | 11/1985 | Germany . |
| 37 39 558 | 6/1989 | Germany . |
| 39 19 347 | 2/1990 | Germany . |
| 39 33 653 | 4/1991 | Germany . |
| 41 23 235 | 11/1992 | Germany . |
| 41 32 470 | 4/1993 | Germany . |
| 44 18 771 | 10/1995 | Germany . |
| 195 15 056 | 5/1996 | Germany . |
| 197 03 668 | 8/1997 | Germany . |
| WO 91/04891 | 4/1991 | WIPO . |

*Primary Examiner*—Douglas C. Butler
*Attorney, Agent, or Firm*—Evenson, McKeown, Edwards & Lenahan, P.L.L.C.

[57] ABSTRACT

A process for ensuring a neutral vehicle handling during cornering and a simultaneous load change is provided by the operation of a vehicle system having at least one driven axle, an axle differential gear, wheel brakes for the selective deceleration of an individual wheel, a device for recognizing a cornering and a device for recognizing a coasting operation and for generating a signal corresponding to the intensity of the coasting operation. The problem of rear-wheel driven and front-wheel driven vehicles is the vehicle handling during cornering in the coasting operation. As a result, depending on the method of operation, an oversteering or understeering of the vehicle is caused. The process avoids these problems in that, during a cornering, a wheel of the driven axle is decelerated at least as a function of the coasting operation signal such that the moment generated thereby, such as a counter-yawing moment, compensates the yawing moment caused by the cornering during the coasting operation.

36 Claims, 4 Drawing Sheets

PROCESS FOR ENSURING A NEUTRAL VEHICLE HANDLING DURING CORNERING AND A SIMULTANEOUS LOAD CHANGE

BACKGROUND AND SUMMARY OF THE INVENTION

This invention relates to a process for ensuring a neutral vehicle handling during cornering and a simultaneous load change and, more particularly, to a process for ensuring a neutral vehicle handling during cornering and a simultaneous load change by the operation of a vehicle system having at least one driven axle, an axle differential gear assigned to the driven axle, wheel brakes for the selective deceleration of an individual wheel, a device for recognizing cornering, and a device for recognizing a coasting operation and for generating a signal corresponding to the intensity of the coasting operation.

It is known to use mechanical limited-slip differentials for stabilizing the vehicle handling of motor vehicles. In this case, for example, the traction in the drive operation on roads having a low coefficient of friction is optimized and a clear improvement of the load change behavior is achieved specifically during cornering. However, limited slip differentials have the disadvantage that a basic locking moment and the load-dependent proportion of the locking effect are firmly predetermined. If, as the result of a high engine drag moment, the friction stress on the driven or dragged axle is exceeded, the mechanical lock has a negative effect. In addition, in the case of mechanical limited slip differentials, an antilock operation can no longer take place in the desired manner.

The use of electronic-hydraulic wheel slip control systems is known. Conventionally, they are used to cause a controlled braking intervention in the starting stage so that a limited slip differential effect can be generated.

The implementation of differential locks by an electric or electro-hydraulic braking intervention is described in German Patent document DE 33 30 236 C2, as well as in German Patent document DE 41 32 470 A1 (corresponding to U.S. Pat. No. 5,397,174), among others.

However, by means of the above-mentioned systems, no neutral vehicle handling during cornering and a simultaneous load change particularly in the coasting operation - can be carried out. In these driving conditions, a braking of the driven wheels takes place as the result of the engine braking effect. This results in a more or less large negative slip of the driving wheels. Depending on the driving method (rear-wheel drive or front-wheel drive) and the corresponding coasting force, the vehicle therefore has the tendency to oversteer or understeer. This tendency is schematically illustrated in FIG. 1. The center of gravity of a vehicle with a neutral cornering behavior moves about a center M with the radius R on the solid line which is marked "neutral vehicle". Rear-wheel driven vehicles tend to oversteer so that the cornering radius is reduced. This is characterized in FIG. 1 by the broken line marked "oversteering vehicle". Correspondingly, in the case of a front-wheel driven vehicle, there is the problem of an understeering so that, in comparison to the neutral vehicle, there is a larger cornering radius, as illustrated in FIG. 1 by the line marked "understeering vehicle".

There is therefore needed a process which ensures a neutral vehicle handling and a simultaneous load change.

This need is met according to the present invention by a process for ensuring a neutral vehicle handling during cornering and a simultaneous load change by the operation of a vehicle system having at least one driven axle, an axle differential gear assigned to the driven axle, wheel brakes for the selective a deceleration of an individual wheel, a device for recognizing cornering, and a device for recognizing a coasting operation and for generating a signal corresponding to the intensity of the coasting operation. A wheel of the driven axle during cornering is braked at least as a function of the coasting operation signal such that the moment generated thereby (counter-yawing moment) compensates the yawing moment caused by the cornering during the coasting operation.

According to the present invention, it is essential that, for improving the load change behavior during cornering, a counter-yawing moment is generated on the dragged axle via a controlled braking intervention. The counter-yawing moment counteracts the yawing moment caused by the coasting operation. By means of an optimal compensation of the yawing moment occurring during cornering and a simultaneous coasting operation, a neutral vehicle handling is achieved. The operator can therefore complete the cornering without having to expect an oversteering or understeering of the vehicle.

As the result of the development of forces in the case of rear-wheel drive and/or front-wheel drive vehicles, the front wheel or rear wheel which is on the outside or on the inside during the cornering is braked depending on the understeering or oversteering tendency. Because of the braking of the corresponding wheel, the already existing drag forces caused by the engine braking are increased to a resulting force. By contrast, because of the effect of the axle differential on the other wheel of the axle, the drag force is correspondingly reduced. Because of the resulting braking effect differences, a moment is generated on the whole whose direction is precisely the opposite to the yawing moment caused by the cornering and the coasting operation. A complete compensation will take place when the amount of the counter-yawing moment corresponds precisely to the amount of the yawing moment.

For implementing the process according to the invention, on the one hand, a cornering of the vehicle must be recognized and, on the other hand, the direction of the cornering must be recognized. This can be achieved, for example, by the determination of the differential speed of the wheels on the nonpowered axle and/or of the steering angle and/or of the lateral acceleration.

In order to obtain an optimal compensation of the yawing moment, the extent of the coasting operation should also be determined. This can take place by a comparison of the torque desired by the driver with the frictional moment of the engine, or by the comparison of the throttle valve setting by the driver with the characteristic zero moment curve of the throttle valve in the characteristic engine moment diagram. If the coasting force caused by the engine is known, a conclusion can be drawn on the resulting yawing moment.

A different vehicle handling occurs on roads with a different coefficient of friction. For this reason, it is very advantageous for the coefficient of friction of the road to be included in the calculation of the braking pressure for the brake of an individual wheel which is to be generated for a specific counter-yawing moment. The coefficient of friction of the road can be determined, for example, from the different wheel speeds and the vehicle acceleration.

Since the transmission ratio also plays a role in the determination of the drag forces or of the moments, it is advantageous to also take the engaged gear position into account for the determination of the braking pressure.

An advantageous embodiment of the process is characterized in that the braking operation for generating the counter-yawing moment takes place starting from specific drag forces or wheel slip values. For this purpose, a fixed quantity is determined, for example, a quantity corresponding to the engine drag moment or the wheel slip. The process according to the invention will not be implemented until this quantity exceeds a first limit value. Since the understeering or oversteering behavior can depend specifically on the coefficients of friction of the road, it is advantageous to determine this first control limit value as a function of the coefficient of friction of the road. Preferably., this control limit value is formed in the manner of a hysteresis in that the braking operation starts when a first hysteresis curve is exceeded and is terminated in the case of a falling below a second hysteresis curve. This prevents oscillation in the control circuit. The difference between the two characteristic hysteresis curves can be selected, for example, at about 0.25 km/h.

A particularly advantageous embodiment of the process is characterized in that the first control limit value is determined by a deviation of the speed of the wheel to be braked from the actual vehicle speed. As an alternative, the wheel slip of the wheel to be braked may also be taken into account. These embodiments of the process can be implemented particularly easily because the wheel speeds can be determined without any additional expenditures by means of rotational wheel speed sensors normally existing on the vehicle.

It may be a problem that, as a result of the additional braking of a driving wheel, there is the danger of a cessation of the lateral control of this wheel This is true particularly in the case of rear-wheel driven vehicles when the rear wheel which is on-the outside during the cornering is braked. If the braking force is too high, the overall force resulting from the drag force and the additional braking force reaches such an extent that there is a danger that the lateral control of the vehicle may be lost. This must be prevented. For this reason, the process according to the invention should be terminated in order to ensure continuous lateral control. This is achieved, for example, in that the process according to the invention is terminated when a second control limit value is exceeded. This second control limit value is farther away from the actual speed of the vehicle than the first control limit value.

The process according to the invention will preferably not be terminated before the second control limit value has been exceeded for a specific time period. It is also an advantage for the road friction to be included in the calculation of this time period.

When the process according to the invention is carried out, because of the additional braking of a driven wheel, on the whole, a negative vehicle acceleration occurs which is higher than the deceleration desired by the operator by releasing the accelerator pedal. This additional braking effect can be compensated by a corresponding increase of the engine torque. Since some vehicles already contain an engine drag moment control, this control can be used for compensating the additional negative acceleration. The increase of the engine torque is a function of the additional brake pressure and vehicle-specific data. The increase of the engine torque may therefore also be calculated from these parameters.

A decisive quantity for the counter-yawing moment or the increase of the engine torque is the brake pressure used for the additional braking. The brake pressure must be determinable in any driving condition. A determination possibility is obtained by the addition of the pressure build-up pulses and the subtraction of the pressure reduction pulses in the case of a known P-V diagram.

In addition, the process according to the invention should not be used during normal braking or during the antilock operation of the brakes of the vehicle so that, at a corresponding signal, the process according to the invention should not be carried out or should be terminated.

In an advantageous embodiment, the process according to the invention is also not carried out at speeds less than a specific absolute limit speed, for example, 20 km/h. This leads to a higher vehicle safety and to the avoidance of a pushing operation.

Other objects, advantages and novel features of the present invention will become apparent from the following detailed description of the invention when considered in conjunction with the accompanying drawings.

DETAILED DESCRIPTION OF THE DRAWINGS

In the following, embodiments of the process according to the invention are to be illustrated by means of a rear-wheel driven vehicle. Naturally, the process can also be implemented in the case of front-wheel and four-wheel drive vehicles.

Figure 1:
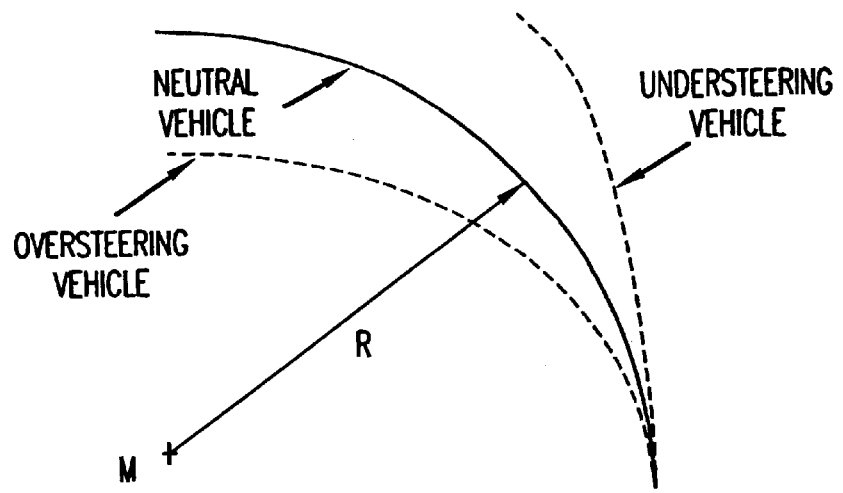
FIG. 1 is a schematic representation of oversteering and understeering behaviors in the case of rear-wheel driven or front-wheel driven vehicles.
Figure 2:
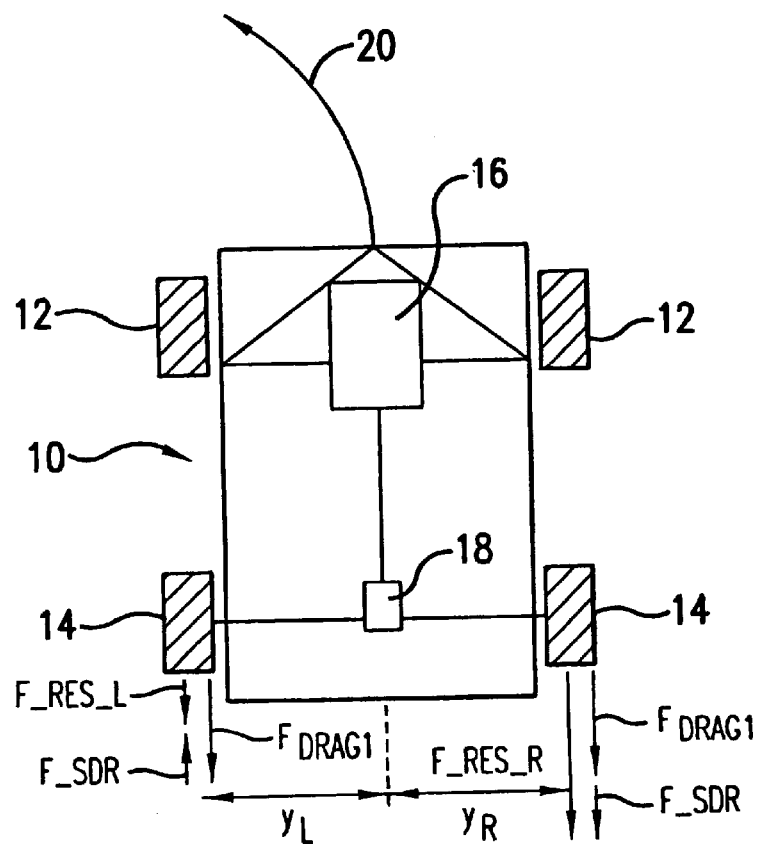
FIG. 2 is a simplified representation of forces which act on the vehicle during the implementation of the process according to the invention.

During cornering and a simultaneous coasting operation, a rear-wheel driven vehicle acts as illustrated in FIG. 1 by means of the broken curve marked "oversteering vehicle". This behavior is the result of the drag forces caused by the engine in the coasting operation and will be explained in detail in FIG. 2. In a very simplified manner, FIG. 2 is the schematic view of a vehicle 10 with two front wheels 12 and two rear wheels 14. The front wheels 10 are not driven; the rear wheels 14 are driven. The drive takes place via an engine transmission system 16 by which the power is transmitted by way of a shaft to a differential gear 18 and from there to the rear wheels 14.

The release of an accelerator pedal causes a coasting operation which can be characterized in that the braking force generated by the engine is transmitted to the rear wheels. The braking force generated by the engine corresponds to the total efficiency of the transmission line $\eta_{total}$ and the total transmission ratio $i_{total}$. Normally, this causes a drag force $F_{drag}$ on the two rear wheels 14 which is equally large on both rear wheels 14. As a result of the different distance of the wheel contact points of the two rear wheels 14 from the point of gravity S of the vehicle, a torque MD__Norm (about the center of gravity S) is obtained. In a first approximation, this torque MD__Norm can be described by the difference of the drag force $F_{dragR}$ of the right rear wheel 14 multiplied by the distance $Y_R$ from the center of gravity $S_R$, on the one hand, and the drag force $F_{dragL}$ and the distance $Y_L$ of the left rear wheel 14 from the center of gravity $S_L$, on the other hand. This is given by the equation:

$$MD\_Norm = F_{dragR} \cdot y_R - F_{dragL} \cdot y_L \tag{1}$$

This moment MD__Norm which occurs during cornering and a simultaneous coasting operation, in the present example, results in an oversteering of the vehicle.

Such an oversteering can be prevented in that the forces $F_{ResR}$, $F_{ResL}$ applied to the rear wheels 14 are changed in such a manner that the resulting moment MD__Res becomes zero. This can be mathematically expressed by the formula:

$$MD\_Res = F_{ResR} \cdot y_R - F_{ResL} \cdot y_L \ (=0) \tag{2}$$

For reaching such a resulting "zero moment", the braking force on the right rear wheel (compare FIG. 2) is increased. As a result, by way of the differential gear 18 of the axle, the drag force on the left rear wheel 14 is decreased. This measure must be carried out in the case of a cornering illustrated by the arrow 20. If the cornering takes place in the other direction, the additional braking of the driven wheel must take place in a precisely opposite manner.

By the operation of the wheel brake assigned to the right rear wheel 14, another force can be added to the assigned drag force $F_{drag}$. The increase or reduction of the drag force $F_{drag}$ on the right or left rear wheel 14 can be varied continuously by the corresponding brake operation.

In the present case—specifically in the case of the left curve according to FIG. 2 the following resulting forces $F_{ResR}$ and $F_{ResL}$ occur for the right and for the left rear wheel 14:

$$F_{ResR} = F_{drag} + F_{SDR} \tag{3}$$

$$F_{ResL} = F_{drag} - F_{SDR} \cdot \eta_{HAG} \tag{4}$$

wherein $\eta_{HAG}$ represents the efficiency of the rear wheel transmission and $F_{SDR}$ represents the additional braking force at the right rear wheel.

The additional braking force $F_{SDR}$ applied at the rear wheel 14 which is on the right in FIG. 2 and is marked $F_{SDR}$ because an effect is achieved as in the case of a limited-slip differential (SDR).

As a prerequisite for the optimal implementation of the process according to the invention, the vehicle must have at least the following capabilities. It must be able to recognize a cornering and also the direction of the curve. Also, a recognition of the coasting operation and the determination of the quantity of the coasting force must be possible. In the present case, modules are also provided for differentiating between roads with a high or a low coefficient of friction for determining the engaged gear position for the engine drag moment control and for calculating the wheel cylinder pressures. In addition, wheel sensors arranged on each wheel determine the respective wheel speed.

The recognition of the cornering is carried out in a known manner such as for example using an engine control unit by calculating the differential speed of both wheels at the nonpowered axle. The direction of the curve takes place by way of the preceding sign.

A differentiation of the road with respect to high or low coefficients of friction can be derived by way of the amount of the speed difference between wheels and from the vehicle acceleration. The derivation can be determined from the reference speed or directly by means of a longitudinal or lateral acceleration sensor in a known manner.

The coasting operation is determined in that the moment desired by the driver is smaller than the frictional moment of the engine stored in the vehicle. This can take place, for example, by the fact that the throttle valve setting of the driver, thus the accelerator pedal position, is smaller than a position in which the engine delivers or receives no moment (characteristic zero moment curve). The latter position is found in a characteristic engine moment diagram by means of which the characteristic zero moment curves are stored in the vehicle.

The overall transmission ratio $i_{total}$ is obtained from the ratio of the rotational engine speed and the rotational wheel speed of the driven axle.

The torque MD__wheel applied at the wheel, in the case of a symmetrical distribution, can be represented by the following mathematical formula:

$$MD\_wheel = 0.5 \cdot MD\_engine \cdot i_{total} \tag{5}$$

wherein MD__engine is the moment at the engine, $i_{total}$ is the total transmission ratio, and $\eta_{total}$ is the overall efficiency of the transmission line.

A first embodiment of the process, specifically a control possibility for the braking pressure to be applied, will be explained in the following by means of FIGS. 3 and 4.

Figure 3:
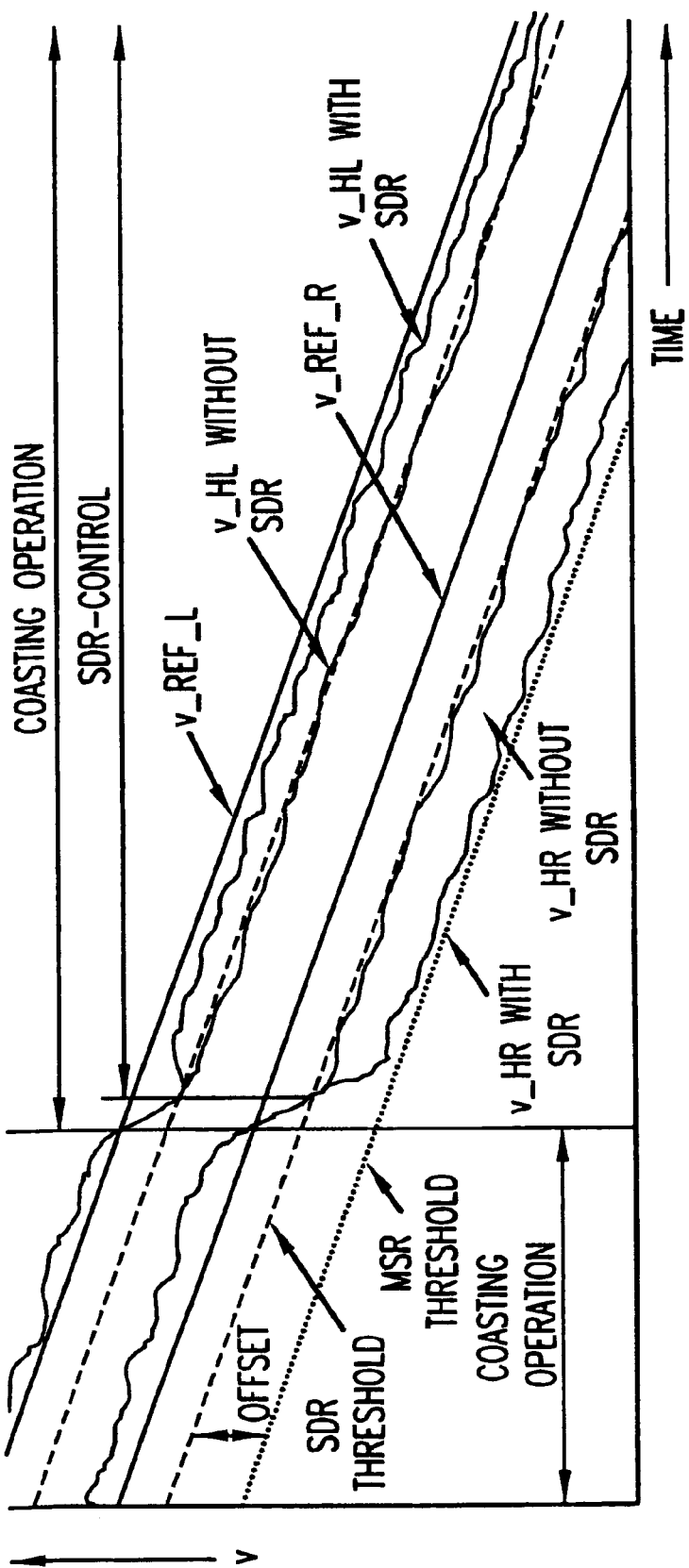
FIG. 3 is a diagram which illustrates the effect of the implementation of the process according to the invention with respect to the speed on the two driven wheels of the vehicle.

FIG. 3 shows a time-speed diagram (time-v-diagram) in which the upper group of curves is assigned to the left rear wheel and the lower group of curves is assigned to the right rear wheel. In simplified terms, one may imagine that a vehicle in the diagram of FIG. 3 is driven from the top left to the bottom right. For each rear wheel 14, the reference speed is entered by means of a solid straight line, specifically v__Ref__L and v__Ref R.

In the first quarter of the diagram, the vehicle is in the coasting operation. As a result, the speeds of both wheels, specifically v__HR and v__HL, are each slightly above the reference speeds v__Ref__R and v__Ref__L.

A straight line which is called "SDR threshold" is entered in each case as a broken line below the reference speed curve. In addition, only relative to the lower group of curves, a dotted straight line is entered which is called "MSR threshold". The function of this straight line will become clear later.

If a change takes place now from the drive operation to the coasting operation, the speeds of both rear wheels v__HL and v__HR will fall below the respective reference speed v__Ref__L and v__Ref R.

However, only when the actual speed of the rear wheel to be braked falls below the "ISDR threshold" will the control operation be started. This takes place in FIG. 3 in the area which is called "SDR control".

As illustrated in FIG. 2, a left curve is driven in the present case. For this reason, the right rear wheel 14 must be braked in the case of the rear-wheel driven, oversteering vehicle. When the SDR control starts, it can be recognized that by means of the braking of the right rear wheel, the speed of the right rear wheel "V__HR with SDR" continues to decrease. In particular, this is easily recognizable from the difference "v HR without SDR" and "v__HR with SDR".

To the extent that the speed on the right rear wheel decreased, by means of the correspondingly decreased drag force on the left rear wheel, the speed of the left rear wheel "v__HL with SDR" is increased. This is particularly easily recognizable from the difference between "v__HL with SDR" and "v__HL without SDR".

The additional braking of the right rear wheel is now controlled to such an extent that the speed of the left rear wheel is just above the SDR threshold (see particularly FIG. 3, upper group of curves).

Figure 4:
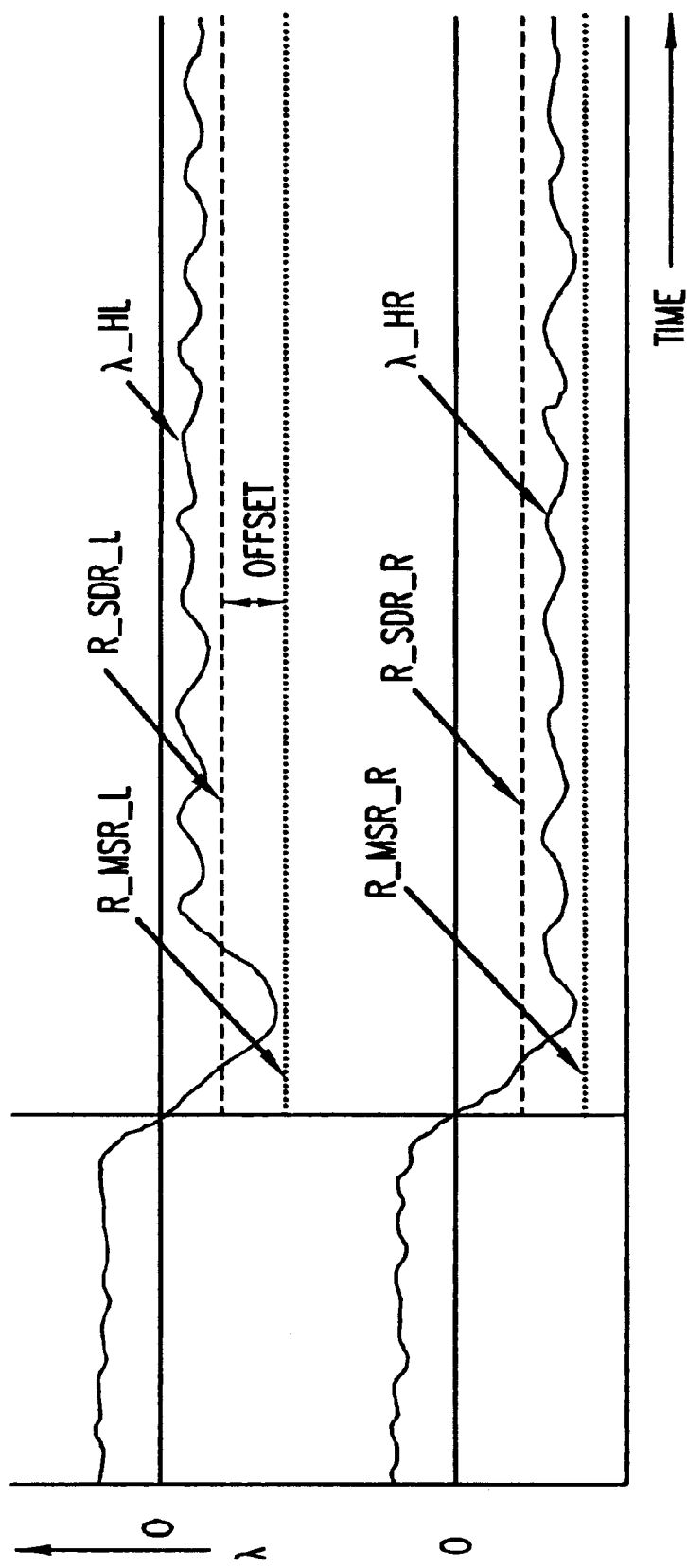
FIG. 4 is a diagram which illustrates an embodiment of the process according to the invention on the two driven wheels with respect to the wheel slip.

The diagram illustrated in FIG. 4 corresponds to the control of FIG. 3, in which case the slip λ is entered on the ordinate with respect to both rear wheels. In the first quarter of the diagram, the upper group of curves again shows the drive operation. In this case, R_MSR_L indicates the control threshold for the left vehicle side with respect to an engine slip control; R_SDR_L indicates the control threshold for the left vehicle side with respect to the SDR-control; and λ_HL indicates the slip on the left rear wheel. A corresponding situation applies to the right vehicle side for the lower curve with respect to the data R_MSR_R, R_SDR_R and λ_HR.

As also explained above by means of FIG. 3, when there is a falling below the SDR control threshold on the right rear wheel, a braking operation is carried out such that the slip on the left rear wheel λ_HL does not fall below the SDR control threshold at the left rear wheel R_SDR_L.

When a curve is driven in the other direction, the diagram curves with respect to the right and left vehicle side must be exchanged because the braking intervention will then take place on the left rear wheel.

In the two described diagrams, the control threshold for the SDR operation was in each case determined as an offset of a control threshold for the engine slip control.

Figure 5:
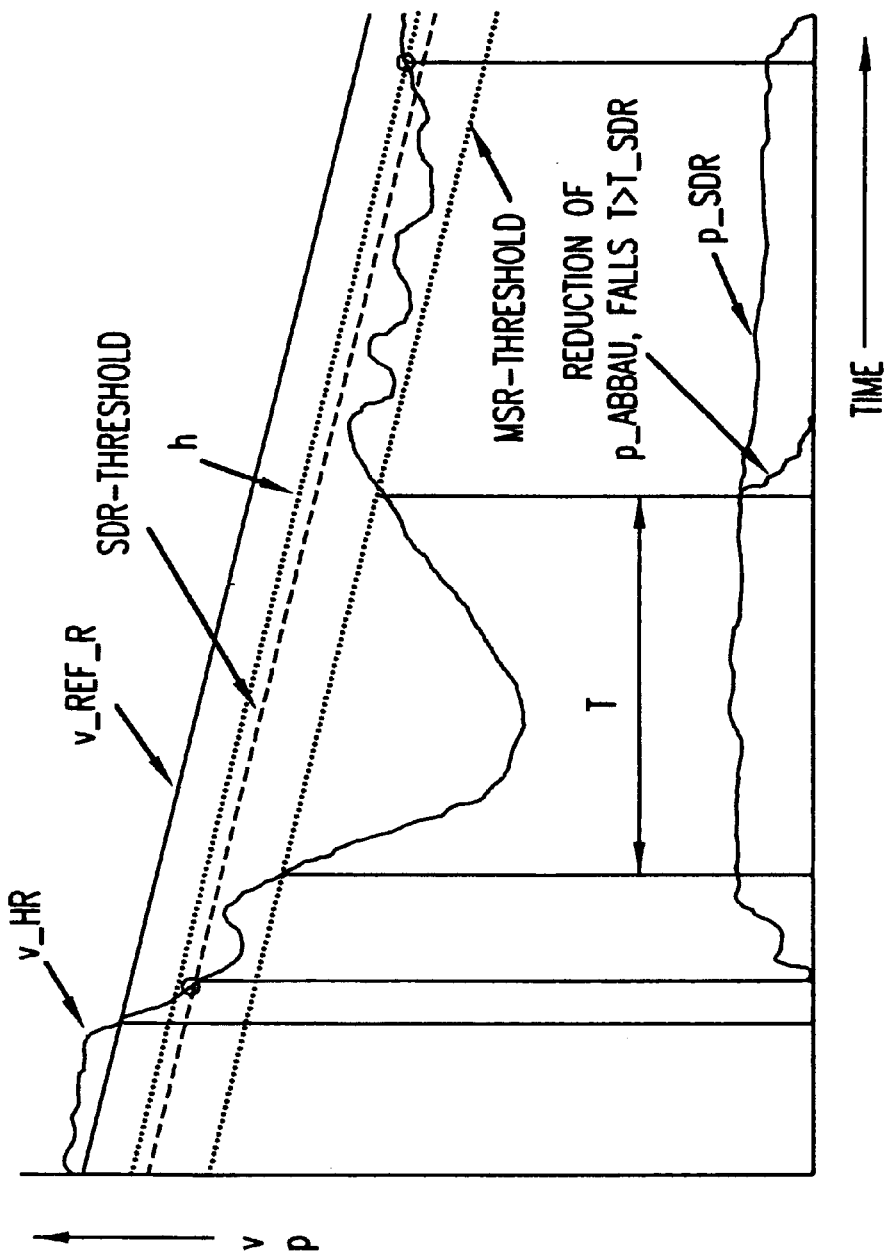
FIG. 5 is a diagram which illustrates the termination of the process according to the invention when there is the risk of losing the lateral control of the rear wheel.

In particular, FIG. 5 illustrates the function of the engine slip control threshold in the case of this process. The upper area of the diagram of FIG. 5 again shows a time-speed diagram for the right rear wheel. In this case, the "SDR-threshold" is now constructed as a hysteresis with a distance h so that an oscillation in the SDR control circuit can be prevented. When there is a falling below of the lower hysteresis curve, the control is implemented, and when the upper hysteresis is exceeded, the control is terminated.

If, by means of the operation of the brake on the—in the present case—right rear wheel 14, the total braking force $F_{ResR}$ is increased too much, the respective wheel speed will decrease to such an extent that the lateral control by the wheel which is on the outside during the cornering can no longer be ensured. This will occur when—as illustrated in FIG. 5—the speed curve falls below the MSR threshold.

When there is a falling below the MSR threshold for a specific time period T of, for example, 600 msec, the SDR control is terminated. In FIG. 5, this is illustrated in that, in the lower area of the diagram, a pressure-time representation is indicated in which the reduction of the braking pressure is characterized by the curve p_reduction.

If, as illustrated in FIG. 5, the resulting force on the right rear wheel $F_{ResR}$ is again above the MSR control threshold still within the time T, the SDR control is continued (compare curve p_SDR).

According to an alternative embodiment, the time duration for which the speed of the wheel to be braked may fall below the MSR threshold can be variably set according to the coefficient of friction of the road.

In the case of a normal termination of the SDR control, specifically the exceeding of the SDR threshold or of the upper hysteresis curve of the SDR threshold, a pressure reduction for the termination of the SDR control is continuously initiated. As the difference h between the two hysteresis curves, a value of, for example, 0.25 km/h is suggested.

Since the offset between the SDR threshold and the MSR threshold may be a function of the coefficient of friction of the road, it is possible to prevent an SDR control at low coefficients of friction, but rather to make the control adaptive in the case of medium and high coefficients of friction. Thus, at low coefficients of friction, the offset may, for example, be set at 0 km/h (that is, SDR threshold=MSR threshold) or −∞ km/h, which would equal a prohibition of the SDR. At high coefficients of friction, the offset can be set at 1 km/h.

Another advantage of the described embodiment is the fact that, in comparison to the use of mechanical limited-slip differentials, a limited-slip differential effect can be selected which is a function of the braking pressure of the brake to be operated, and this can take place continuously. The limited-slip differential effect can be terminated, for example, as a function of the coefficient of friction ($\mu_F$) of the road. In the present case, at low coefficients of friction ($\mu_F$=0.1), a lock of 5% can be selected; at medium coefficients of friction ($\mu_F$=0.4), a lock of 20% can be selected; and at high coefficients of friction ($\mu_F$=0.8), a lock of 40% can be selected. However, other setting values are also possible.

An alternative control with respect to the above control process is also possible. The moment applied to a rear wheel and caused by the engine drag moment is known or is to be determined. For this reason, the counter-yawing moment MD_SDR to be generated can be calculated as follows in a first approximation:

$$\text{MD\_SDR}=0.5 \cdot K2 \cdot \text{MD\_friction} \cdot \eta_{total} \cdot i_{total} \tag{6}$$

with K2 representing a function of the coefficient of friction $f(\mu_F)$, for example, K2=0.5·$\mu_F$, MD_friction representing the frictional moment of the engine; and $\mu_{Total}$ or $i_{total}$ representing the total transmission ratio or the total efficiency of the transmission line.

On the other hand, the moment MD_SDR generated by an additional braking pressure for the buildup of the limited-slip differential p_SDR, in a first approximation, can be expressed as follows:

$$\text{MD\_SDR}=2 \cdot \text{A\_piston} \cdot \text{p\_SDR} \cdot \mu\_\text{brake} \cdot \text{r\_w}. \tag{7}$$

wherein

A_piston describes the piston diameter of the caliper;

p_SDR describes the brake pressure for the buildup of the torque by SDR;

$\mu$_brake describes the coefficient of friction between the brake lining and the brake disk; and r_w describes the effective friction radius of the brake disk for a 2-piston or 1-piston floating caliper disk brake system.

In this case, the brake pressure p_SDR can be determined from a pressure model. All other parameters in Equation (7) are vehicle-specific and therefore fixed.

By equating the equations (6) and (7), the wheel braking pressure p_SDR to be fed can be determined as follows:

$$\text{p\_SDR}=(0.5 \cdot K2 \cdot \text{MD\_friction} \cdot \eta_{Total} \cdot i_{total})/(2 \cdot \text{A\_piston} \cdot \mu\_\text{brake} \cdot \text{r\_w}) \tag{8}$$

In Equation (8), the only parameters to be determined are the coefficient of friction $\mu_F$ in K2 as well as the engine friction moment MD_friction. If these two quantities are known, the wheel cylinder pressure can be calculated in the above-indicated manner because all other quantities are vehicle-specific constants.

The wheel cylinder pressures can be calculated by adding the pressure buildup pulses and subtracting the pressure reduction pulses in the case of the known P-V diagram of the brake so that, corresponding to the calculated wheel cylinder pressures and of the required braking demand, a feeding or a discharge of the pressure medium to or from the brake to be acted upon can take place.

A correspondingly sensitive providing of pressure in the relevant pressure range (0 to 40 bar) can take place by an optimized timing of the pump motor already existing in the vehicle. A corresponding timing is described in German Patent document DE 44 08 879 A1 to which specific reference is made.

In rear-wheel driven vehicles, in the case of the currently customary brake designs, usually no additional accumulator is required for a fast provision of pressure.

In the above-mentioned example, the process according to the invention was explained by means of a rear-wheel driven vehicle. Naturally, the process can also be carried out in the case of a front-wheel driven vehicle. For this purpose, the wheel which is on the inside during the cornering must then be braked. The pertaining diagrams change correspondingly.

In the case of an understeering front-wheel drive, by means of the braking of the front wheel which is on the inside during the cornering, the front wheel which is on the outside during the cornering is accelerated and is therefore brought into the range of a lower slip. This also improves the lateral control so that a termination of the SDR control is not absolutely necessary when the wheel which is on the inside during the cornering falls below the MSR control threshold.

The volume absorption of the forward brake system and the flow rate of the pump would have to be examined more closely in the case of conventional vehicles in order to be able to supply information concerning the constructing of an additional accumulator for a fast pressure buildup.

The described process according to the invention provides a simple and low-cost system for ensuring a neutral vehicle handling during cornering and a simultaneous load change. In the coasting operation, the locking effect can be variably adjusted almost continuously between 0 and 100w. The locking effect can also be adaptively adjusted to different coefficients of friction of the road. In addition, no mechanical differential lock is required which results in a high cost advantage. Also, no additional hardware is required in a plurality of current vehicles. The process could be implemented by means of the simple insertion of a software module in already existing control units. These control units or "ECUs" are well known in the automotive field and include microprocessors and associated memories for performing a number of control functions. In the case of a software-type implementation, special cases can also be taken into account in which an increase of the locking effect is prohibited.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for operating a vehicle system having at least one driven axle, an axle differential gear assigned to the one driven axle, wheel brakes for the selective deceleration of an individual wheel, a corner recognition device, and a coasting operation recognition device in order to ensure a neutral vehicle handling during cornering and a simultaneous load change, the process comprising the steps of:

recognizing vehicle cornering via the corner recognition device;

recognizing a coasting operation via the coasting operation recognition device;

generating a coasting operation signal corresponding to an intensity of the coasting operation recognized by the coasting operation recognition device;

braking a wheel of the driven axle during cornering at least as a function of the coasting operation signal in order to generate a counter-yawing moment; and compensating a yawing moment caused by the cornering during the coasting operation via said counter-yawing moment generated by the braking of the wheel of the driven axle.

2. The process according to claim 1, further comprising the steps of:

for rear-wheel driven vehicles, braking a rear wheel which is located on an outside during cornering when there is a tendency to oversteer; and braking the rear-wheel which is on an inside during cornering when there is a tendency to understeer.

3. The process according to claim 1, wherein for recognizing cornering, at least one of the following steps are performed:

determining a differential speed of the wheels on a non-powered axle;

detecting a steering angle of the vehicle; and detecting a lateral acceleration of the vehicle.

4. The process according to claim 2, wherein for recognizing cornering, at least one of the following steps are performed:

determining a differential speed of the wheels on a non-powered axle;

detecting a steering angle of the vehicle; and detecting a lateral acceleration of the vehicle.

5. The process according to claim 1, further comprising the step of drawing a conclusion as to an extent of the coasting operation by one of the following steps:

comparing a torque desired by a driver of the vehicle and a frictional moment of an engine of the vehicle; and comparing a throttle valve setting of the driver and a characteristic zero moment curve in a characteristic engine moment diagram.

6. The process according to claim 2, further comprising the step of drawing a conclusion as to an extent of the coasting operation by one of the following steps:

comparing a torque desired by a driver of the vehicle and a frictional moment of an engine of the vehicle; and comparing a throttle valve setting of the driver and a characteristic zero moment curve in a characteristic engine moment diagram.

7. The process according to claim 3, further comprising the step of drawing a conclusion as to an extent of the coasting operation by one of the following steps:

comparing a torque desired by a driver of the vehicle and a frictional moment of an engine of the vehicle; and comparing a throttle valve setting of the driver and a characteristic zero moment curve in a characteristic engine moment diagram.

8. The process according to claim 1, further comprising the steps of:

determining a coefficient of friction of a road on which the vehicle is travelling; and factoring into account the determined coefficient of friction in a calculation of a brake pressure to determine the counter-yawing moment in the case of the wheel to be braked.

9. The process according to claim 2, further comprising the steps of:

determining a coefficient of friction of a road on which the vehicle is travelling; and factoring into account the determined coefficient of friction in a calculation of a brake pressure to determine the counter-yawing moment in the case of the wheel to be braked.

10. The process according to claim 3, further comprising the steps of:

determining a coefficient of friction of a road on which the vehicle is travelling; and factoring into account the determined coefficient of friction in a calculation of a brake pressure to determine the counter-yawing moment in the case of the wheel to be braked.

11. The process according to claim 5, further comprising the steps of:
   determining a coefficient of friction of a road on which the vehicle is travelling; and
   factoring into account the determined coefficient of friction in a calculation of a brake pressure to determine the counter-yawing moment in the case of the wheel to be braked.

12. The process according to 8, wherein the coefficient of friction is determined from different wheel speeds and a vehicle acceleration.

13. The process according to claim 1, further comprising the step of factoring into account an engaged gear position of the vehicle during a determination of the brake pressure.

14. The process according to claim 1, wherein the braking step for generating the counter-yawing moment occurs when a specific vehicle operating condition exceeds a first control limit value.

15. The process according to claim 14, wherein the specific vehicle operating condition is one of a wheel speed difference and a slip of a driven wheel.

16. The process according to claim 14, wherein the first control limit value is determined as a function of a coefficient of friction of a road on which the vehicle is travelling.

17. The process according to claim 14, wherein the first control limit value is formed with a hysteresis, and the braking step starts when a first hysteresis curve is exceeded and is terminated when a falling below a second hysteresis curve occurs.

18. The process according to claim 16, wherein the first control limit value is formed with a hysteresis, and the braking step starts when a first hysteresis curve is exceeded and is terminated when a falling below a second hysteresis curve occurs.

19. The process according to claim 14, wherein the first control limit value is determined by a predetermined deviation of a speed of the wheel on the driven axle from an actual vehicle speed, or of a wheel slip of a driving wheel.

20. The process according to claim 17, wherein the first and second hysteresis curve of the first control limit value are determined by a predetermined deviation of a speed of the wheel on the driven axle from an actual vehicle speed, or of a wheel slip of a driving wheel.

21. The process according to claim 1, wherein the braking step for generating the counter-yawing moment is terminated when a road grip of the wheel taking over a lateral control is about to cease.

22. The process according to claim 21, wherein the braking step is terminated when, in the case of rear-wheel driven vehicles, a deviation of the wheel speed of the rear wheel which is on the outside during the cornering from an actual vehicle speed or a wheel slip exceeds a second control limit value.

23. The process according to claim 22, wherein a first control limit value regulating when the braking step takes place or first and second hysteresis curves of said first control limit value are determined by an offset of the second control limit value.

24. The process according to claim 22, wherein the braking step is terminated when the second control limit value has been exceeded for a specific time period.

25. The process according to claim 23, wherein the braking step is terminated when the second control limit value has been exceeded for a specific time period.

26. The process according to claim 24, wherein the specific time period is determined as a function of a road friction.

27. The process according to claim 1, further comprising the step of compensating a negative acceleration additionally caused by the braking step which generates the counter-yawing moment by increasing an engine torque.

28. The process according to claim 27, wherein the increase of the engine torque is determined while factoring into account a braking pressure for the braking step generating the counter-yawing moment and vehicle-specific data.

29. The process according to claim 1, wherein a wheel cylinder braking pressure for the braking step which determines the counter-yawing moment is determined via an addition of pressure buildup pulses and a subtraction of pressure reduction pulses pursuant to a known P-V diagram.

30. The process according to claim 1, wherein the braking step for generating the counter-yawing moment is terminated when a braking operation is normal.

31. The process according to claim 1, wherein the braking step for generating the counter-yawing moment is terminated in an event of an antilock operation of the vehicle.

32. The process according to claim 1, wherein the braking step for generating the counter-yawing moment does not occur when the vehicle is below a predetermined absolute speed.

33. The process according to claim 1, further comprising the steps of:
   for front-wheel driven vehicles, braking a front wheel which is on an inside during cornering when there is a tendency to understeer; and
   braking the front wheel which is on the outside during cornering when there is a tendency to oversteer.

34. The process according to claim 33, wherein for recognizing cornering, at least one of the following steps are performed:
   determining a differential speed of the wheels on a non-powered axle;
   detecting a steering angle of the vehicle; and
   detecting a lateral acceleration of the vehicle.

35. The process according to claim 33, further comprising the step of drawing a conclusion as to an extent of the coasting operation by one of the following steps:
   comparing a torque desired by a driver of the vehicle and a frictional moment of an engine of the vehicle; and
   comparing a throttle valve setting of the driver and a characteristic zero moment curve in a characteristic engine moment diagram.

36. The process according to claim 33, further comprising the steps of:
   determining a coefficient of friction of a road on which the vehicle is travelling; and
   factoring into account the determined coefficient of friction in a calculation of a brake pressure to determine the counter-yawing moment in the case of the wheel to be braked.

* * * * *